(12) United States Patent
Graf et al.

(10) Patent No.: US 6,916,003 B2
(45) Date of Patent: Jul. 12, 2005

(54) DIRECTIONAL-CONTROL VALVE

(75) Inventors: Peter Graf, Gemünden (DE); Herbert Reder, Rothenfels (DE); Rainer Imhof, Lohr (DE); Hans-Georg Schubert, Partenstein (DE); Frank Schwab, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 36 days.

(21) Appl. No.: 10/363,833

(22) PCT Filed: Sep. 4, 2001

(86) PCT No.: PCT/DE01/03378

§ 371 (c)(1),
(2), (4) Date: Sep. 8, 2003

(87) PCT Pub. No.: WO02/21032

PCT Pub. Date: Mar. 14, 2002

(65) Prior Publication Data

US 2004/0046139 A1 Mar. 11, 2004

(30) Foreign Application Priority Data

Sep. 11, 2000 (DE) .......................................... 100 45 008
Jul. 17, 2001 (DE) .......................................... 101 33 990

(51) Int. Cl.⁷ .............................................. B65B 1/04
(52) U.S. Cl. .............................. 251/129.07; 137/625.16
(58) Field of Search ....................... 251/129.07, 129.15; 137/625.16

(56) References Cited

U.S. PATENT DOCUMENTS

| | | | | |
|---|---|---|---|---|
| 4,413,648 A | * | 11/1983 | Walters et al. | ............... 137/486 |
| 5,607,137 A | * | 3/1997 | Kanda et al. | ........... 251/129.07 |
| 5,918,635 A | | 7/1999 | Wang et al. | |
| 6,065,734 A | | 5/2000 | Tackett et al. | |
| 6,854,703 B2 | * | 2/2005 | Parker et al. | ............. 251/30.01 |

FOREIGN PATENT DOCUMENTS

| | | |
|---|---|---|
| DE | 3528781 A | 2/1987 |
| DE | 4425843 | 1/1996 |
| DE | 19518333 A1 | 11/1996 |
| DE | 4422742 C2 | 2/1997 |
| DE | 19946996 A1 | 5/2000 |
| DE | 19928748 A1 | 9/2000 |
| EP | 0687843 A | 12/1995 |

* cited by examiner

*Primary Examiner*—Steven O. Douglas
(74) *Attorney, Agent, or Firm*—Boyle Fredrickson Newholm Stein & Gratz S.C.

(57) ABSTRACT

Disclosed is a directional control valve comprising a front-side connector and at least one radial connector, wherein the front faces of a valve body (valve shift or seat body) of the directional control valve are pressurized approximately equally, so that the actuating forces for shifting the valve body are minimal. In accordance with the invention, the pressure for pressurizing a rearward front face of the valve body is tapped at an axial distance to the valve body.

16 Claims, 10 Drawing Sheets

DIRECTIONAL-CONTROL VALVE

BACKGROUND OF THE INVENTION

1. Field of the Invention

The invention relates to a directional control valve comprising a valve body guided in a housing, via which a front-side connector can be connected with a radial connector.

2. Description of the Related Art

Continuously adjustable directional control valves are, for instance, used as proportionally adjustable throttles. The directional control valve can be flown through in two directions, i.e. from the front-side connector to the radial connector and—in the opposite direction—from the radial connector to the front-side connector. The valve body may, for instance, be designed as a cup-shaped valve shift with radial openings being formed in the casing thereof, via which the radial connector can be opened or closed. The actuation of the valve is preferably performed by means of a proportionally adjustable electromagnet via the plunger of which the valve body can be shifted against the force of a compression spring. In order to minimize the actuating forces, the pressure acting on the front side of the valve body is guided into a rearward pressure chamber via a connecting bore, so that the valve body is substantially pressure-balanced.

In FIG. 11, which is referred to as early as now, the volumetric flow characteristic of such a two-two directional control valve is illustrated, with the stroke performed by the valve body being illustrated in relation to the relative input voltage of the electromagnet, i.e. to the input voltage in relation to the maximum voltage. The different performance curves characterize the volumetric characteristics for various pressure differences Δp, wherein the flattest performance curve represents a small pressure difference while the performance curves become steeper with increasing pressure difference Δp. According to FIG. 11, the right, flat performance curve corresponds to a stable, ideal course, such as it ensues as a rule with a through-flowing from the front-side connector to the radial connector or—in the case of through-flowing in the opposite direction—with low pressure differences. In the case of higher pressure differences and volume flows (left performance curve in FIG. 11), abrupt bursting of the valve body may occur. This abrupt bursting is shown by the step in the left performance curve of FIG. 11, according to which the stroke increases sharply with constant input voltage. Furthermore, it may be taken from FIG. 11 that instabilities, which are shown by the oscillations in the performance curve, may occur when through-flowing from the radial connector to the front-side connector takes place at high volume flows.

The afore described instabilities, i.e. the abrupt bursting of the valve body and the oscillations in the end portion of the stroke, result from the flowing forces acting upon the valve body in the case of high volume flows, which act on the valve piston such that the actual throttle cross-section does not correspond to the value that is at that moment predetermined by the input voltage in the case of ideal conditions. It is of particular disadvantage that the performance curves with valves of the volumetric flow characteristic illustrated in FIG. 10 differ for the two through-flow directions, i.e. the through-flowing from the front-side connector to the radial connector and in opposite direction, so that the consumers cannot be triggered in the predetermined manner.

SUMMARY OF THE PRESENT INVENTION

The object of the invention therefore is to provide a directional control valve with which instabilities occurring at high pressure differences are minimized in both through-flow directions.

This object is solved by means of a directional control valve comprising the features of claim 1.

In accordance with the invention, the pressure acting on the rear side of the valve body is not—like with the initially described solution—tapped directly at the valve body, but in the area of the front-side connector, i.e. when seen in the through-flow direction from the radial connector to the front-side connector, downstream of the valve body. By this measure, the influence of the flowing forces on the valve body can be minimized, so that an abrupt bursting of the valve body or the occurrence of instabilities in the end stroke portion can be eliminated or at least highly decreased.

The directional control valve may be provided as a sliding valve or as a seat valve and may be provided currentless open or closed. It may furthermore be designed as an on-off valve or as a continuously adjustable valve.

Several alternative solutions lend themselves for tapping the pressure at the front side. In the case of one solution according to the invention, an axial bore is formed in the valve body, said bore, on the one side, opening into an inner front face of the valve body and, on the other side in a rearward front face of the valve body limiting the pressure chamber. A small tube is inserted into this axial bore, said tube extending out of the valve body towards the front-side connector, or beyond it, if required.

In the case of a second, alternative solution, the connecting bore is formed as a housing channel which, on the one side, opens into the area of the front-side connector and, on the other side, in the pressure chamber. This solution is substantially more robust than the afore described variant in which the small tube projecting towards the connector may break off or vibrate off in the case of high strain, so that great effort is necessary for fixing the tube.

One difficulty when designing the housing channel consists in that it has to be placed such that it does not begin to cut the radial connector, so that, in particular when the radial connector is formed by radial bore stars, a relatively complex and exact channel guiding is required. The effort in forming the housing channel may be decreased when this bore begins to cut the radial bore or the radial bores, respectively, of the radial connector and is then sealed by a sealing tube preferably inserted from the front side.

The housing channel is preferably designed as an angle bore, with an axially extending portion being bored from the front-side connector and a leg inclined vis-à-vis thereto being bored as an inclined bore from the pressure chamber.

Possibly existing instabilities in the case of great pressure differences may be further reduced in particular with directional control valves that are prestressed in an opening position when, in parallel to a housing channel, a second connecting channel passing through the valve body is provided, via which the pressure acting on the front side of the valve body is tapped as control pressure.

The connecting channel passing through the valve body is preferably provided with an axial portion which merges into radial sections that open into the rearward pressure chamber.

In a variant of this solution, at least one transverse bore is provided in the connecting channel passing through the valve body between the front face of the valve body and the radial portions, via which a further pilot oil cross section can be opened through which pressure medium can reach the rearward pressure chamber. This pilot oil cross section is opened after a predetermined axial shifting of the valve body.

In an embodiment that is particularly easy to manufacture, the radial connector of the directional control valve opens directly, i.e. without a circumferential groove, into the valve bore incorporating the valve body. It turned out surprisingly that the instabilities in the case of great pressure differences can be further reduced by means of this direct opening of the bore star forming the radial connector.

The volumetric flow characteristic of the directional control valve can be further improved when the valve body is allocated an inner piston that is stationary in the housing and is positioned in the inner chamber of the valve body. A damping chamber connected with the pressure chamber is in this variant limited by the front face of the inner piston, on the one hand, and by the inner front face of the valve body, on the other hand. The flowing forces occurring are introduced into the housing via the inner piston, so that no interactions with the valve body occur. The volumetric characteristics of such a directional control valve are again distinctly improved vis-à-vis the afore described solutions. Pressure variations may be compensated by the damping chamber being connected with the pressure chamber via a throttle bore.

The mounting of the inner piston is particularly efficient when it is mounted in the valve housing by a straight pin passing through the casing of the valve body.

The valve body of the directional control valve is preferably designed as a valve shift that is adjustable via a proportional magnet.

Further developments of the invention are the subject matter of the further subclaims.

BRIEF DESCRIPTION OF THE DRAWINGS

In the following, preferred embodiments of the invention will be described in detail by means of schematic drawings.

DETAILED DESCRIPTION OF THE PREFERRED EMBODIMENTS

Figure 1:
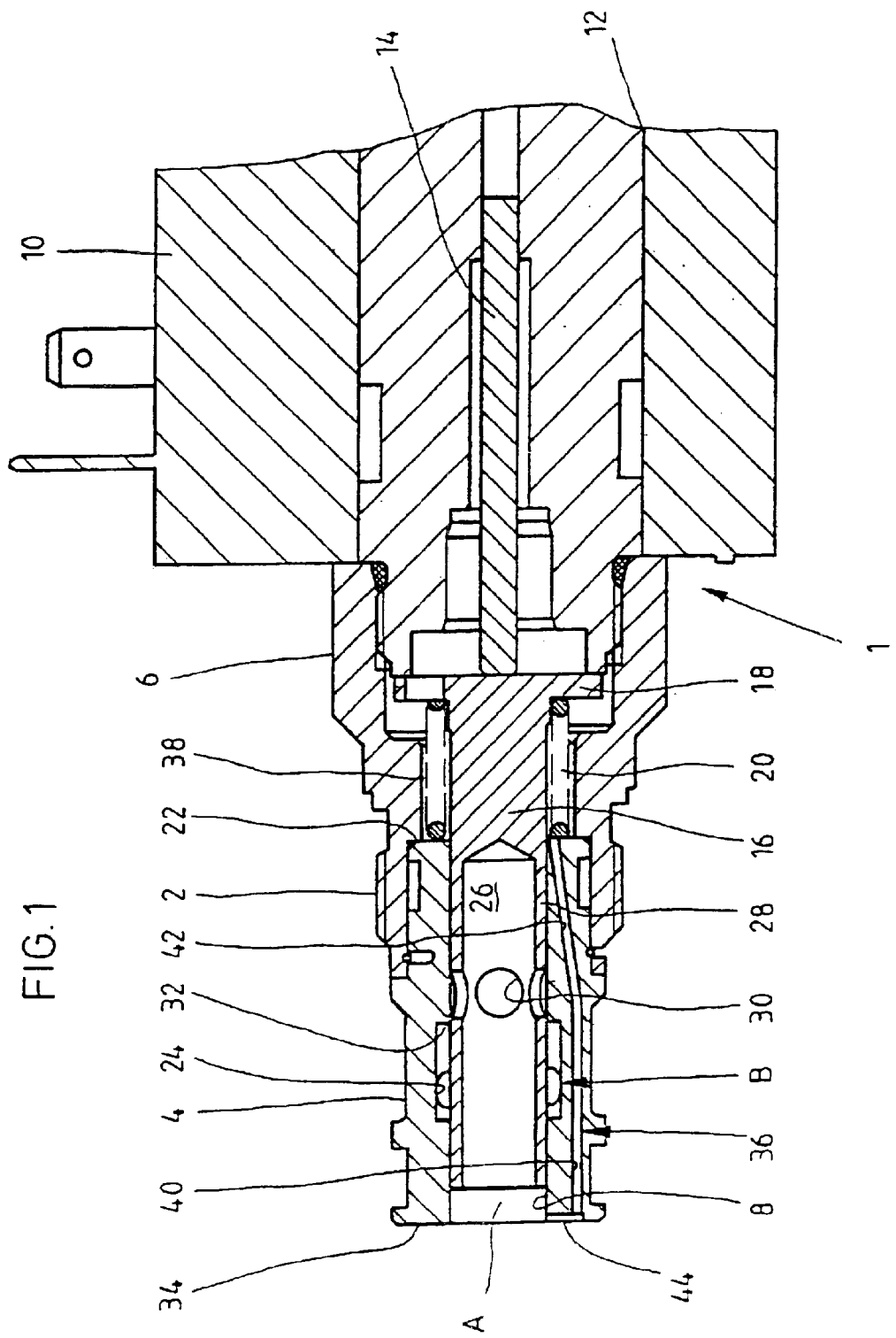
FIG. 1 illustrates a longitudinal section through a first embodiment of a two-two directional control valve according to the invention.

FIG. 1 illustrates a first embodiment of a directional control valve 1 in accordance with the invention which is designed as an electrically operated two-two directional control slip-in cartridge valve in hollow slide valve construction.

The directional control valve 1 comprises a two-part valve housing 2 with a sheath 4 and a flange portion 6 at the outer periphery of which a thread is provided for screwing the slip-in cartridge valve in a valve block or a plate. The sheath 4 and the flange portion 6 are passed through by an axial bore 8 which is widened gradually in the area of the flange portion 6. In the flange-portion-side opening area of the axial bore 8 an inside thread is provided into which an electromagnet 10 in the form of a proportional magnet is screwed. In the embodiment illustrated, the electromagnet 10 comprises a screw-in collar 12 that immerses into the axial bore 8 of the flange portion 6. A plunger 14 connected with an armature of the electromagnet 10 is in contact with a valve shift 16 with its free end portion, said valve shift 16 being guided axially shiftable in the sheath 4. In the embodiment illustrated in FIG. 1, the valve shift 16 comprises a rearward annular collar 18 which is in engagement with a compression spring 20 that is supported against the adjacent front face 22 of the sheath 4, so that the valve shift 16 is prestressed against the adjacent front face of the screw-in collar 12 and against the plunger 14.

The directional control valve 1 comprises a connector A formed by the front-side opening of the axial bore 8, and a radial connector B formed by a radial bore star 24, said radial connector B being closed the version of the normal position of the directional control valve 1 illustrated in FIG. 1.

The valve shift 16 that is designed as a hollow slide valve comprises a casing 28 surrounding an inner chamber 26, said casing 28 comprising a plurality of case openings 30 distributed at the periphery which are, in the normal position illustrated, closed by a control land 32 formed by a circumferential edge of an annular chamber of the radial connector B, so that the connection between the connectors A and B is blocked.

In the valve sheath 4, a housing bore 36 is formed which, on the one hand, opens into the front side of the connector A illustrated at the left in FIG. 1 and, on the other hand, in the right, flange-portion-side front face 22 of the sheath 4, so that the front-face area of the sheath 4 is connected with the spring chamber 38 incorporating the compression spring 20 and limited by the radially widened portion of the axial bore 8 of the flange portion 6 and the front face 22. In the embodiment illustrated in FIG. 1, the housing bore 36 is designed as an angle bore with a leg 40 provided at an axial distance to the valve axis and a leg designed as an inclined bore opening into the rearward spring chamber 38. Such a housing bore 36 can be manufactured in an extremely simple manner by means of boring from the front sides.

For tapping the pressure at the working connector A, a radial groove 44 is provided in the front side 34, said radial groove 44 extending from the axial bore 8 toward the axially extending leg 40 of the housing bore 36. By means of the housing bore 36 the pressure prevailing in the opening area of the axial bore 8 is reported to the rearward spring chamber 38, in which the end portion of the valve shift 16 that is illustrated at the right in FIG. 1 is arranged, so that its front faces effective in the opening and closing direction are pressurized with approximately equal pressure—the actuating forces for the electromagnet 10 are thus reduced to a minimum. On actuation of the electromagnet 10, an axial position of the valve shift 16 occurs that is substantially dependent on the pressure force of the compression spring 20, the actuating force of the electromagnet, the pressure at the connectors A, B, and the flowing forces acting upon the valve shift 16. These flowing forces may, in particular in the case of through-flowing of the two-two directional control valve 1 from the radial connector B in the direction to the axial connector A—as initially mentioned—, attain a substantial dimension not to be neglected.

For actuation of the directional control valve 1, the electromagnet 10 is triggered, so that the valve shift 16 is, in accordance with the illustration in FIG. 1, moved towards the left by means of the plunger 14 against the force of the compression spring. During this axial shifting of the valve shift 16, the case openings 30 are opened via the control land 32, so that the front-side connector A is hydraulically connected with the radial connector B. The pressure prevailing in the spring chamber 38 is tapped at a relatively large axial distance to the case bores 30, so that the influence of the flowing forces is substantially reduced vis-à-vis the conventional solutions in which the pressure was reported to the spring chamber 38 simply by an inner bore of the valve shift 16 opening into the inner chamber 26. A sudden bursting of the valve in the case of high through-flows and pressure differences over the directional control valve 1 can thus be prevented reliably. In this manner, the efficient throttle cross section of the two-two directional control valve determining the pressure difference can be predetermined very exactly by the electromagnet 10, with the volumetric flow characteristics being almost identical in the case of a through-flow from the working connector A to the working connector B and in the opposite direction—these performance curves will be dealt with in more detail in the following.

A limitation with the afore described solution is that the housing bore 36 crosses the radial bore star 24, so that, in particular with small rated quantities, a very exact bore guiding is requited to prevent a cutting and thus short-circuiting of these channels.

Figure 2:
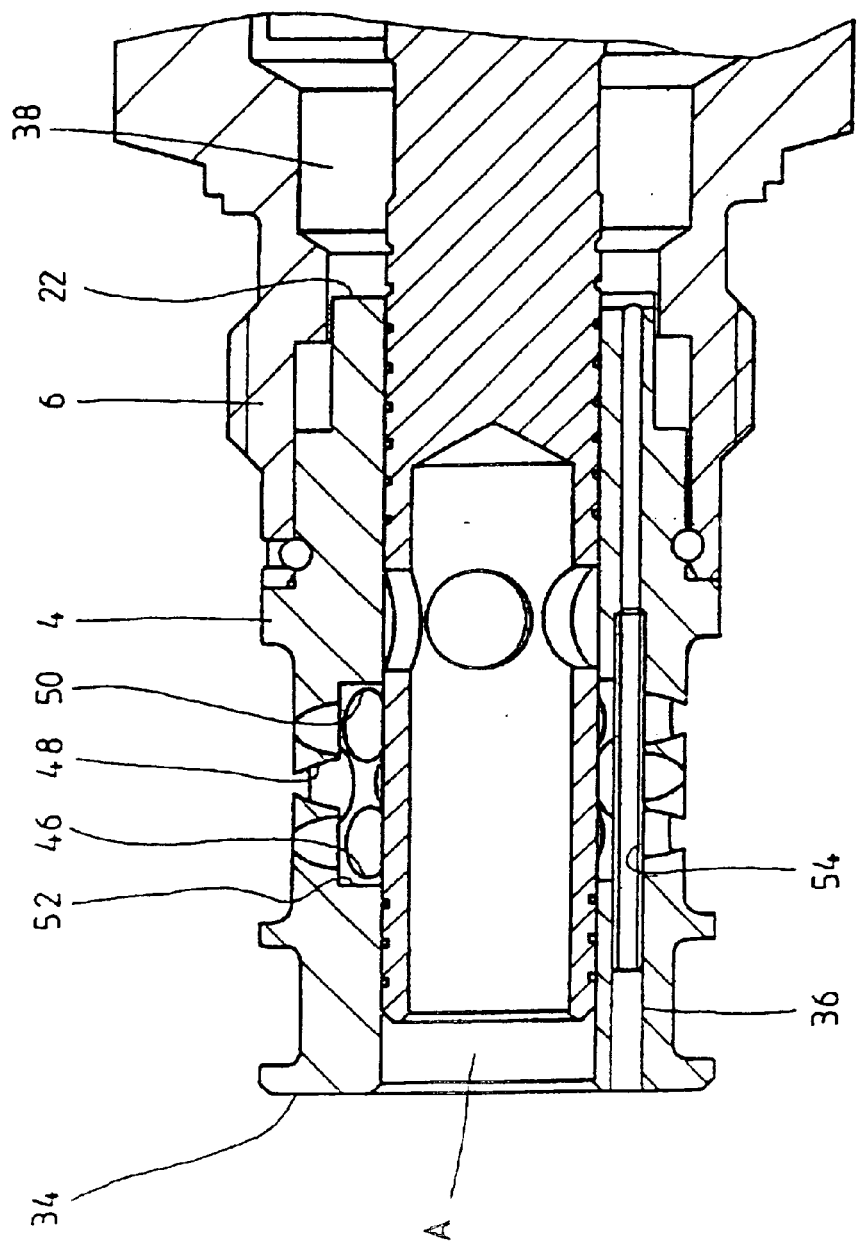
FIG. 2 illustrates a variant of the directional control valve of FIG. 1.

This limitation can be minimized by means of the embodiment illustrated in FIG. 2. This embodiment has the same basic structure as the directional control valve 1 illustrated in FIG. 1, so that components corresponding to each other have, to simplify matters, been provided with identical reference numerals, and a recurrent description of these identical components has been omitted. In the case of the embodiment illustrated in FIG. 2, the radial bore star of the radial connector B is formed by three axially displaced bore stars 46, 48, 50 opening into a common annular chamber 52. The housing bore 36 is provided at an axial distance to the valve axis and extends as a straight bore from the front side 34 to the front face 22 of the sheath 4 limiting the spring chamber 38.

By means of the plurality of radial bores of the connector B, it is practically inevitable that the housing bore 36 cuts the bore stars 46, 48, 50. In order to prevent a short-circuit between the connectors A and B, a sealing tube 54 is inserted from the front side 34 in the crossing region between the bore stars 46, 48, 50 and the housing bore 36, so that the housing bore 36 is sealed against the bore stars 46, 48, 50. In the case of the embodiment illustrated, the housing bore 36 is designed as a step bore, with the sealing tube 54 being inserted into a radially expanded portion and thus is close to a radial shoulder. The sealing tube 54 may be incorporated in the housing bore 36 with press fit, so that the effort of manufacturing is minimal.

Figure 3:
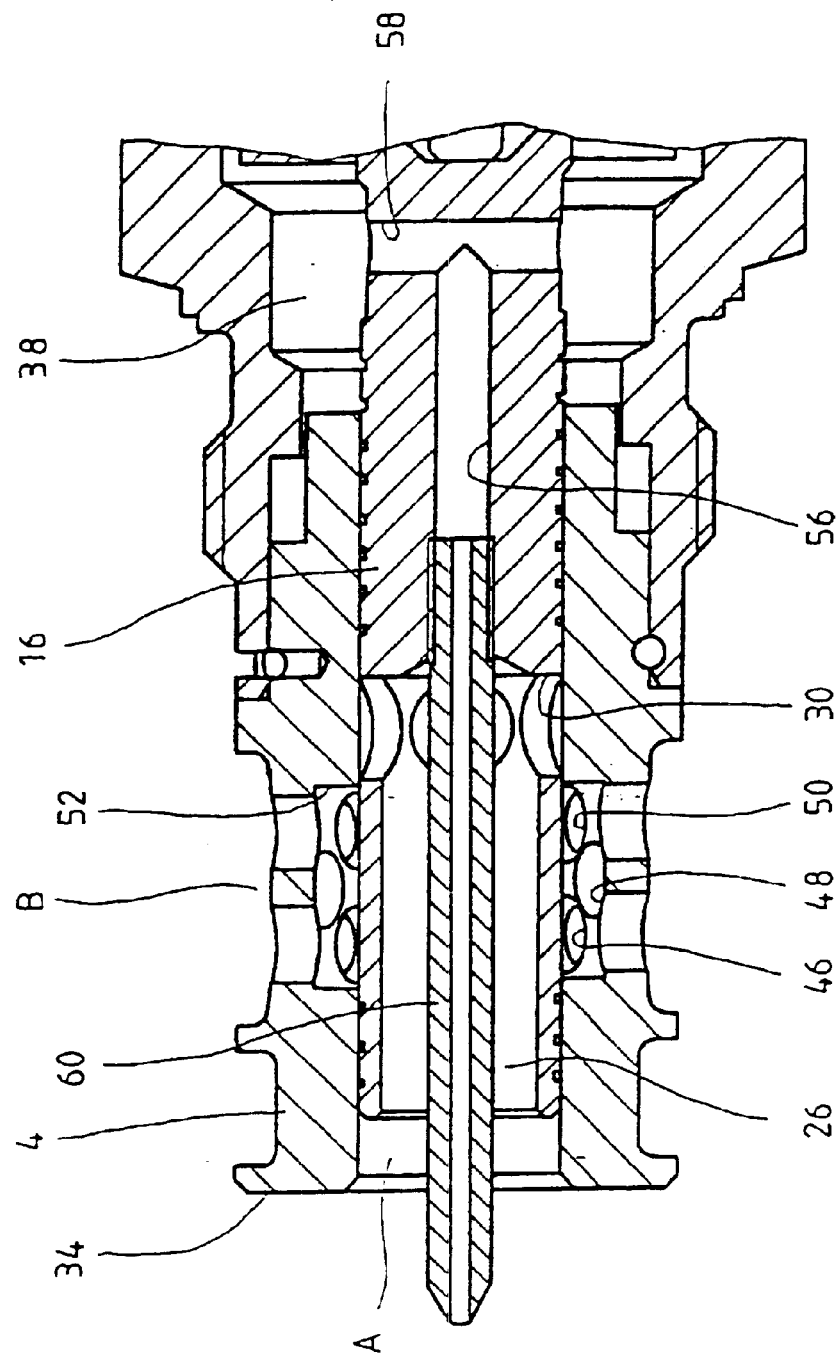
FIG. 3 illustrates another embodiment of a directional control valve wherein the pressure for compensation of the flowing forces is tapped via a tube.

FIG. 3 illustrates an embodiment in which the effort of manufacturing is again reduced vis-à-vis the afore described solutions. The basic structure of the valve illustrated in FIG. 3 corresponds to that of FIG. 2. This means that bore stars 46, 48, 50 displaced vis-à-vis one another are provided in the sheath 4, said bore stars opening into the annular chamber 52. In contrast to the afore described solutions, the pressure effective in the area of the connector A is not reported to the rearward spring chamber 38 via a housing bore, but via an inner bore 56 of the valve shift 16. This inner bore 56 opens, on the one side, into the inner chamber 26 and, on the other hand, via radial bore 58 into the spring chamber 38. In order to minimize the influence of the flowing forces that are high in particular in the reversing area of the pressure medium, a small tube 60 is inserted in the radial bore, said small tube 60 passing through the inner chamber 26 and extending towards the front side 34 of the sheath 4 or—as shown in FIG. 3—beyond it, so that the pressure effective in the spring chamber 38 is tapped at large axial distance to the case openings 30.

Figure 4:
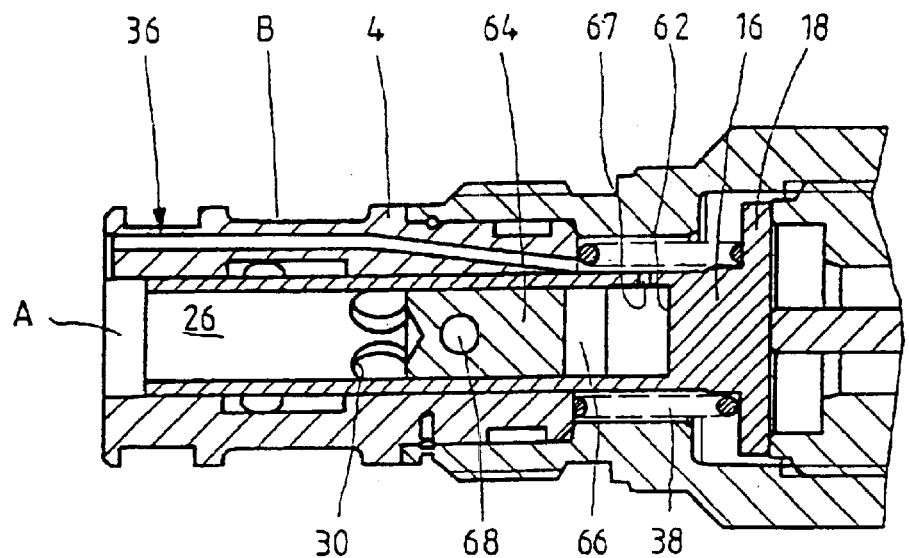
FIGS. 4 and 5 show sections through another embodiment of a directional control valve with an inner piston.
Figure 5:
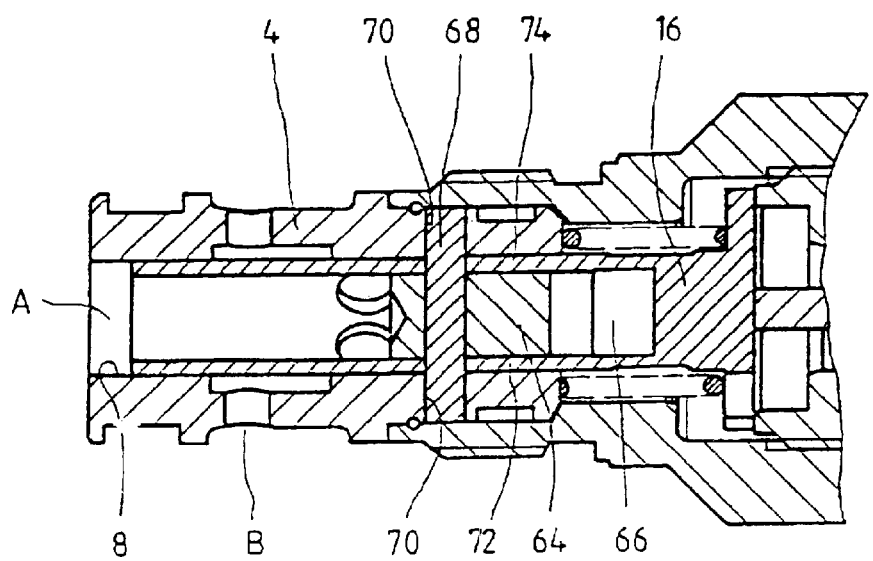

In FIGS. 4 and 5, another embodiment of a two-two directional control valve in accordance with the invention is illustrated, in which the influence of the flowing forces vis-à-vis the afore described solutions has again been reduced. FIGS. 4 and 5 show sectional representations of the directional control valve 1, the basic structure of which again corresponds to that of FIG. 1. In the sheath 4, a housing bore 36 designed as an angle bore is provided, via which the pressure at the axial connector A is reported to the rearward spring chamber 38. In contrast to the afore described embodiments, the inner space 26 of the valve shift 16 is axially extended towards the annular collar 18, so that the area between the case openings 30 and an inner front face 62 of the inner chamber 26 has a greater axial length than in the case of the afore described embodiments. In this area, an inner piston 64 that is stationary in the housing is provided, on the outer periphery of which the valve shift is guided in a sealing manner. A damping chamber 66 limited by the front face of the inner piston 64 and the inner front face 62 is, in the illustrated embodiment, connected with the spring chamber 38 via a throttle bore 67 in the casing of the valve shift 16, so that substantially equal pressure, i.e. the pressure at the working connector A, prevails in the spring chamber 38 and in the damping chamber 66.

As results in particular from FIG. 5, the inner piston 64 is anchored in the sheath 4 via a pin 68. This pin 68 passes through the inner piston 64 and the casing of the valve shift 16 in radial direction, with the two end portions being incorporated in radially extending receiving bores 70 of the sheath 4. In order to enable the axial shifting of the valve shift 16 vis-à-vis the inner piston 64 that is stationary in the housing, two long holes 72, 74 are provided in the casing of the valve shift 16, said long holes being passed through by the pin 68. By this construction, the inner piston 64 is supported on the sheath 4 and thus on the valve housing, while the valve shift 16 is further guided in an axially shiftable manner in the axial bore 8 and in a sealing manner at the outer periphery of the inner piston 64. The pressure at the front-side connector A is guided to the throttle chamber 66 via the housing bore 36, the spring chamber 38 and the throttle bore 67, so that the inner front face 62 is also pressurized with the pressure prevailing at the front-side connector A.

The flowing and stream forces caused in particular in the area of the case openings 30 by the reversal and the pressure difference over the throttle cross section are introduced into the sheath 4 via the inner piston 64 and the pin 68, so that the interactions with the valve shift 16 are minimal. By means of the throttle bore 67, the influence of highfrequency pressure variations in the throttle chamber 66 can be dampened, so that an optimum response characteristic of the directional control valve 1 is ensured.

Figure 6:
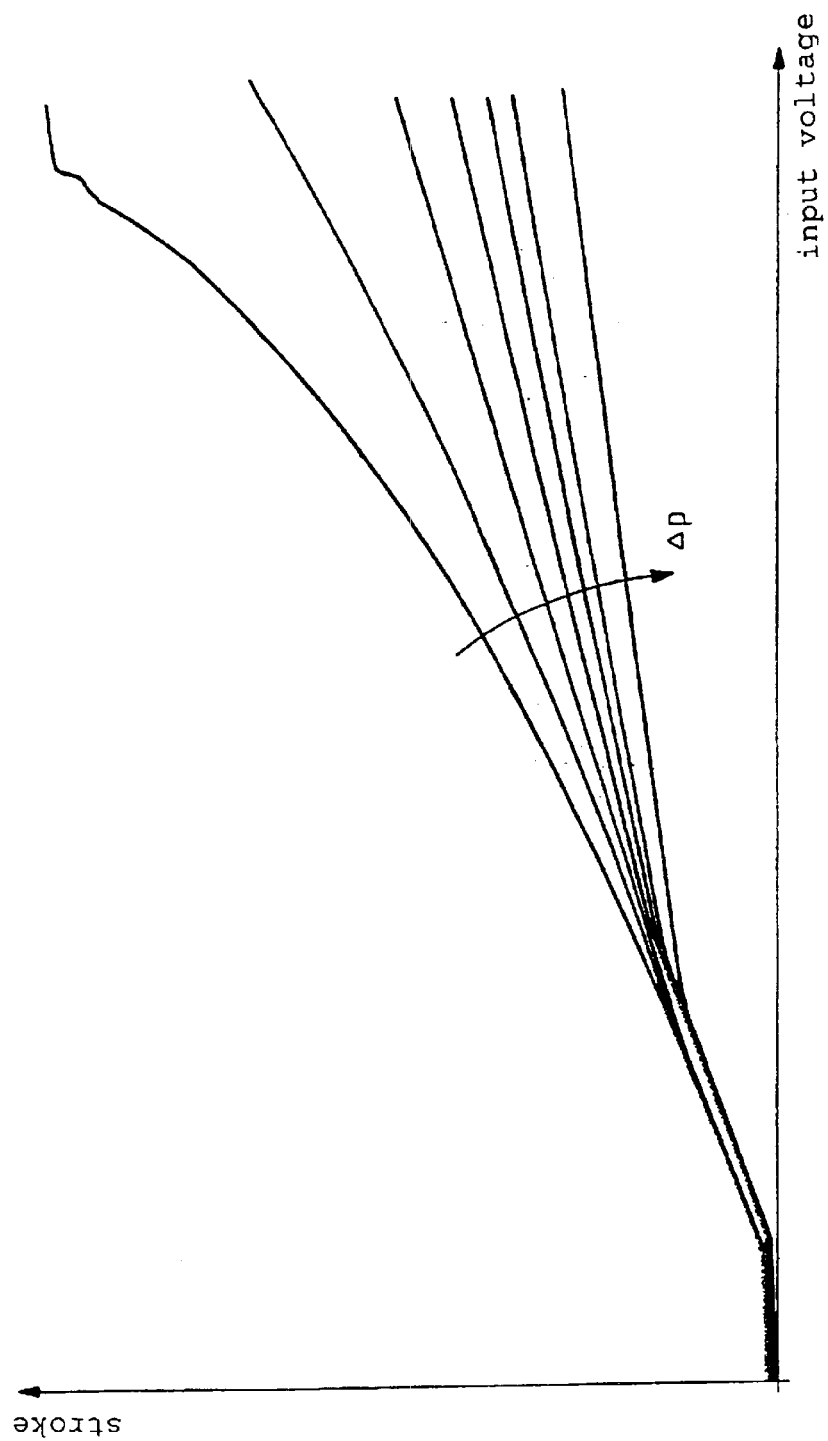
FIG. 6 shows performance curves of a two-two directional control valve in accordance with the invention pursuant to FIGS. 4, 5.
Figure 11:
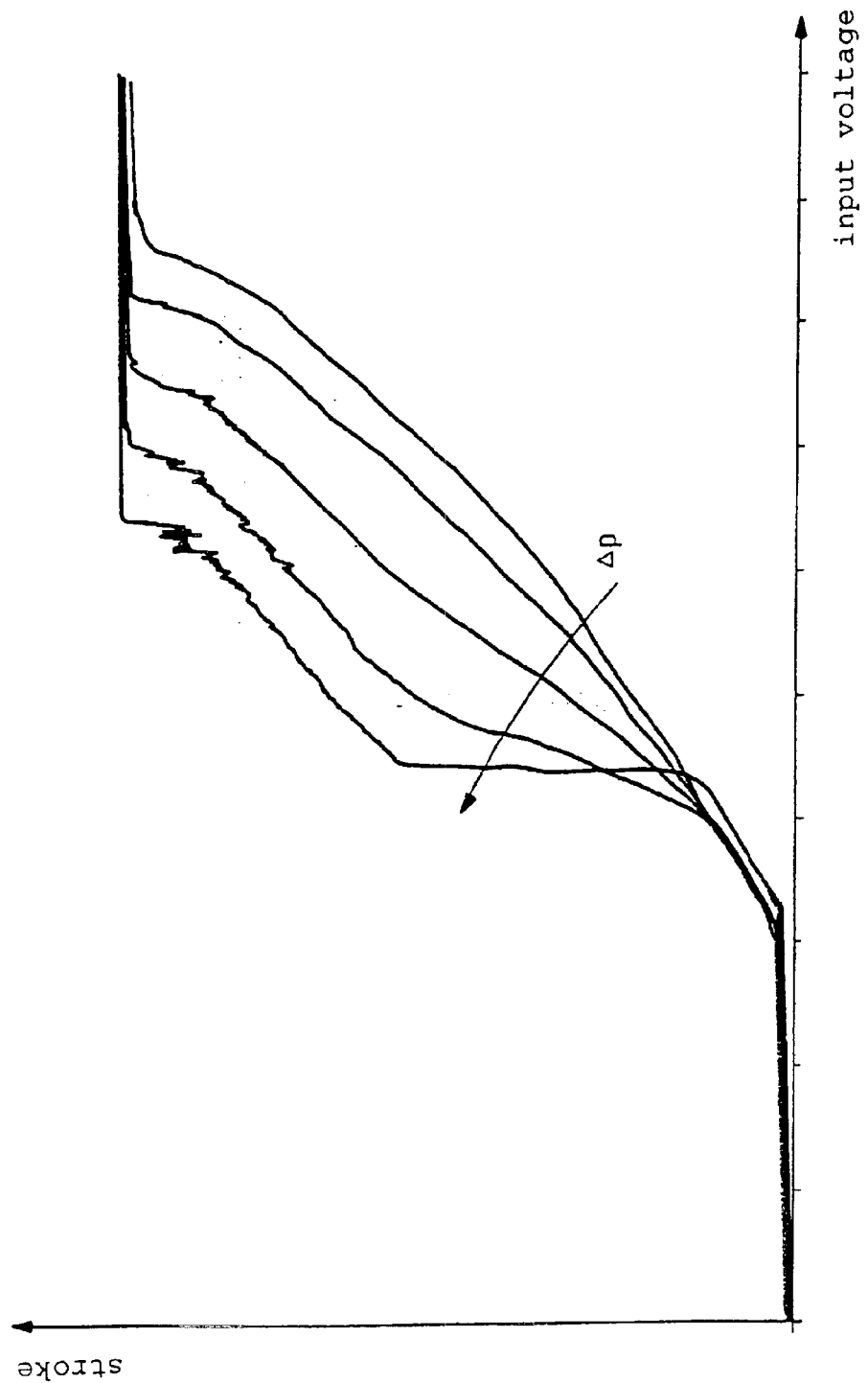
FIG. 11 shows the set value stroke performance curves of a conventional two-two directional control valve.

FIG. 6 illustrates the performance curves of such an optimized two-two directional control valve. The set value stroke performance curves show that the instabilities recognizable in the conventional solutions (FIG. 11) practically do no longer occur. The performance curves have an almost ideal, linear course, with no bursting tendency at all being observable. In the illustration according to FIG. 6, the pressure differences Δp over the directional control valve increase in the direction of the arrow. In the case of higher pressure differences Δp there results—as may be taken from the flattening of the performance curves—rather a tendency to a pulling tight of the valve, so that the flowing forces pressurize the valve shift in closing direction. Such a behavior is substantially better to master than the bursting tendency of conventional solutions. The performance curves illustrated in FIG. 6 are practically identical in the solutions according to the invention for a through-flowing from the connector A to the connector B and vice versa, so that the consumer can be triggered optimally.

The afore described embodiments are constructed such that the directional control valve is closed in the case of a currentless electromagnet (currentless closed). The inventive concept with the tapping of the pilot oil (pressure medium) at a distance to the front face of the valve shift 16 can, of course, also be put into practice with directional control valves 1 that are open in the case of a currentless electromagnet (currentless open). Such embodiments will be explained by means of FIGS. 7 to 9.

Figure 7:
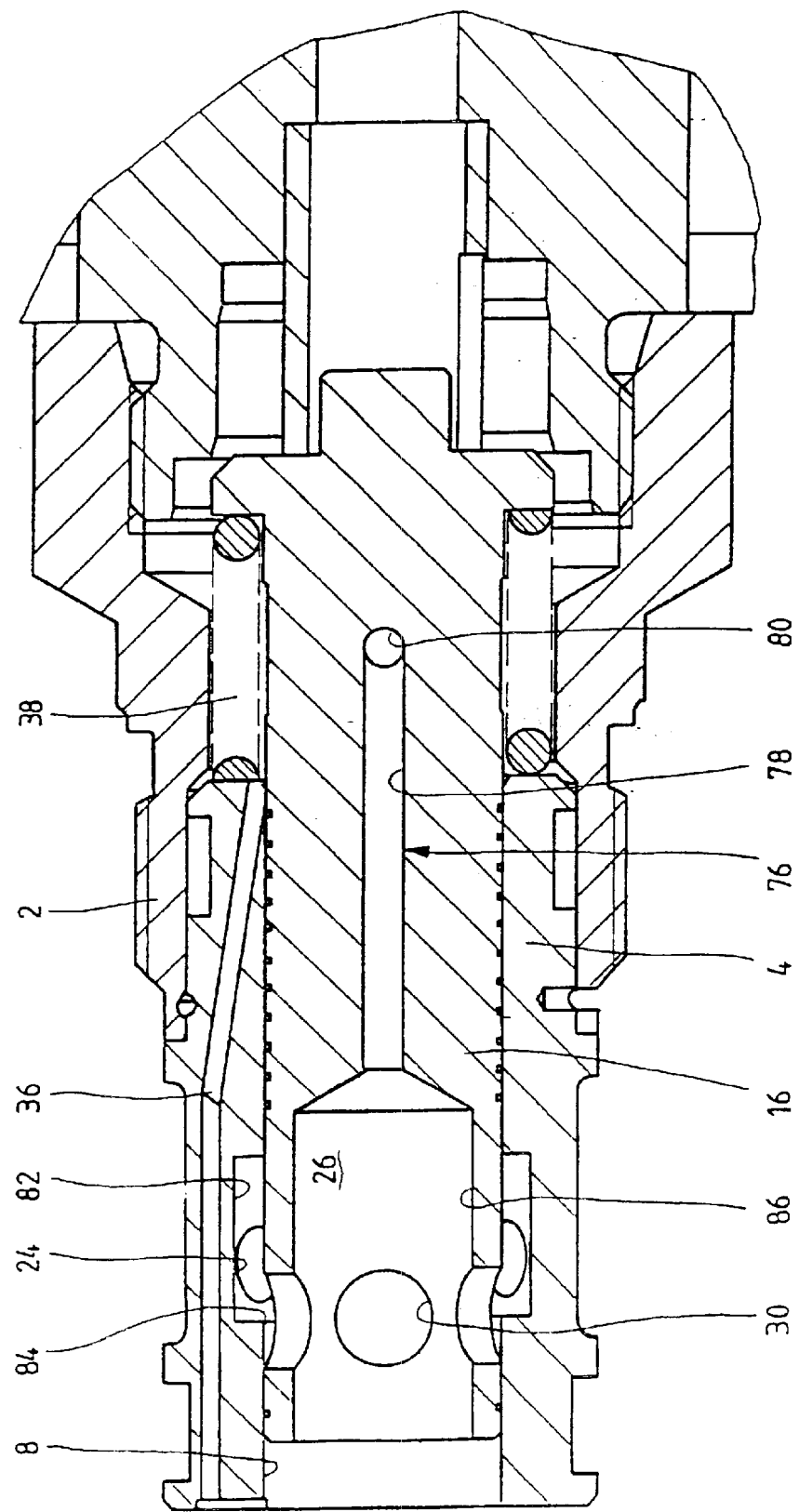
FIG. 7 shows a sectional representation of an embodiment of a directional control valve that is open in its normal position (currentless open)
Figure 8:
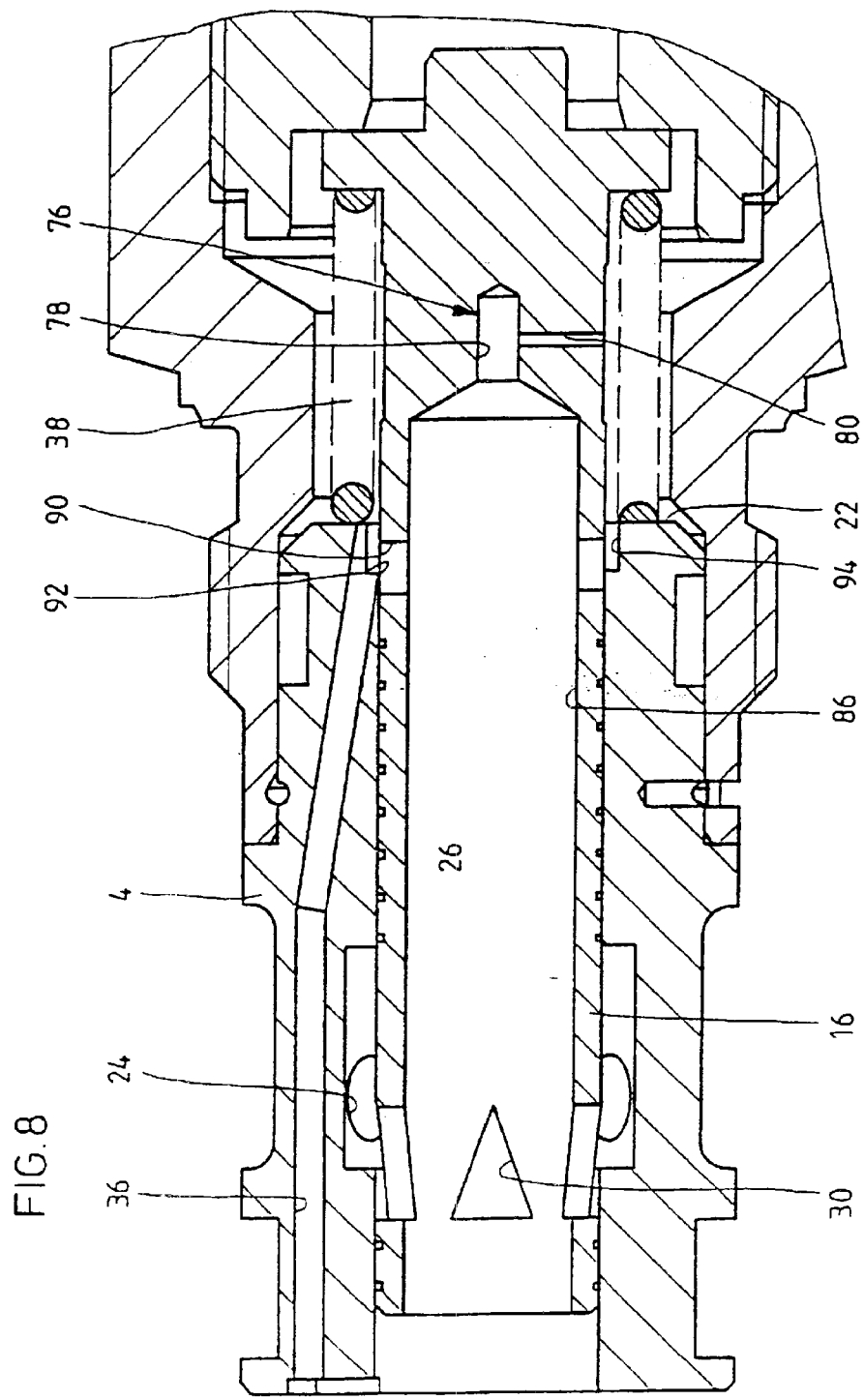
FIG. 8 shows a variant of the embodiment illustrated in FIG. 7 with improved through-flowing characteristics.
Figure 9:
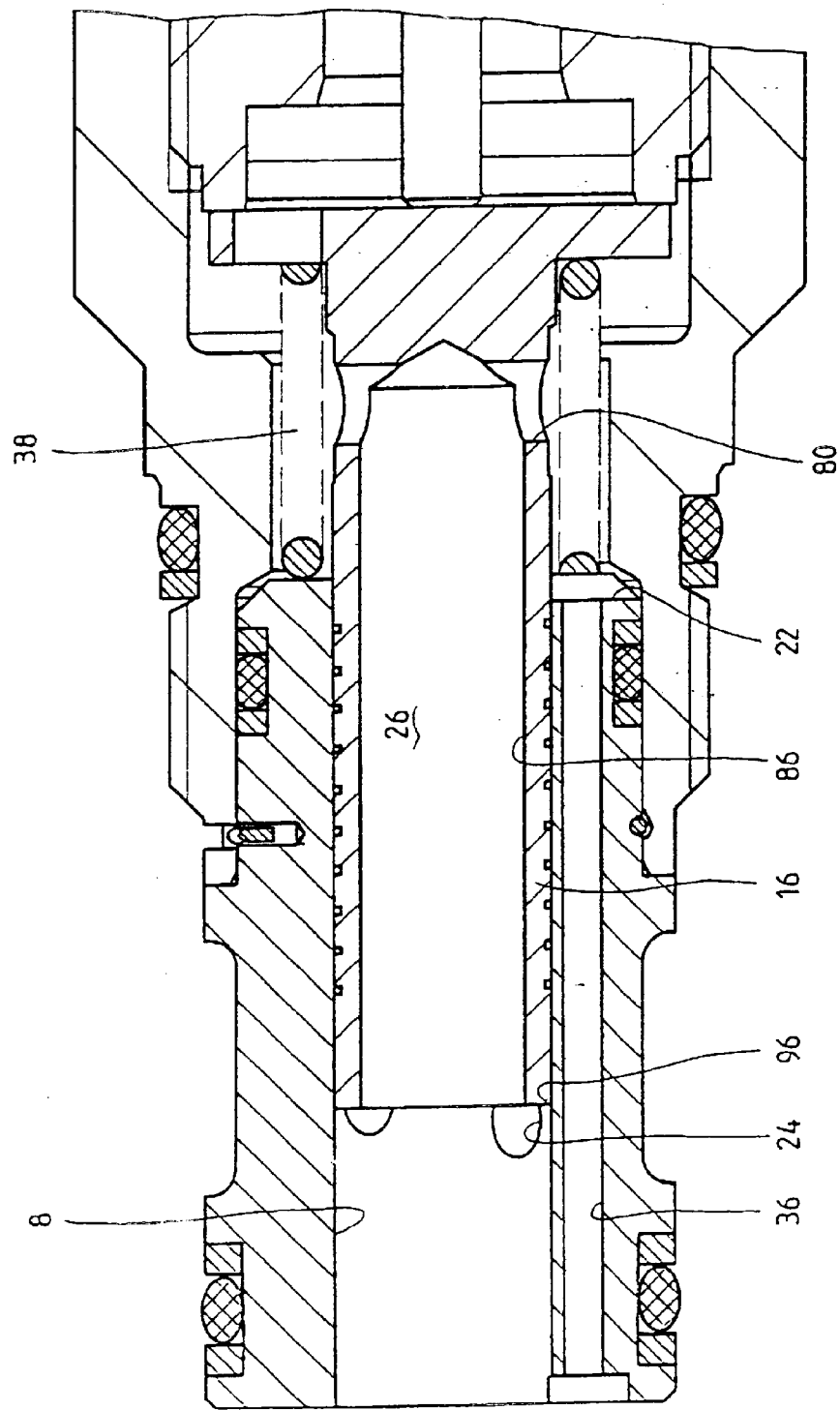
FIG. 9 shows another improved variant of the embodiment of FIG. 7.

The basic structure of the embodiments illustrated in FIGS. 7 to 9 corresponds to the valve illustrated in FIG. 1, so that merely the differences are dealt with here.

On principle, the construction of the currentless closed valve may be transferred to a currentless open valve in which the case openings 30 in the valve shift 16 are axially shifted to such an extent that they are hydraulically connected with the radial bore star 24 in the normal position, and that these connections are closed on axial shifting. This means that, similar to the embodiment shown in FIG. 7, the case openings 30 are shifted to the left vis-à-vis the illustration in FIG. 1.

Preliminary tests showed that such a solution still comprises certain instabilities in the through-flowing characteristics in the case of great pressure differences. For elimination of these instabilities, in the embodiment illustrated in FIG. 7 a connecting channel 76 is provided in the valve shift 16 parallel to the connecting bore 36 in the valve housing 2 which, on the one side, opens into the inner chamber 26 of the valve shift 16 and, on the other side, into the spring chamber 38. The diameter of this connecting channel 76 is larger than that of the housing bore 36.

In the embodiment illustrated in FIG. 7, the connecting channel 76 has an axial portion 78 which merges in at least one radial portion (perpendicular to the drawing plane in FIG. 7) 80 opening into the spring chamber 38. Such a connecting channel 76 can thus easily be formed by axial and radial bores. The diameter of the radial portion 80 is chosen relatively small, so that it acts as a nozzle.

Similar to the afore described embodiments, the radial bore star 24 opens into an annular groove 82 provided in the inner peripheral wall of the axial bore 8. The axial position of the case openings 30 is chosen such that they are closed during an axial shifting of the valve shift 16 by a control land 84 of the annular groove 82, so that the connection from the connector A to the connector B is closed.

In the variant illustrated in FIG. 8, the valve shift 16 also comprises a connecting channel 76 via which the inner chamber 26 of the valve shift 16 is connected with the rearward pressure chamber, i.e. the spring chamber 38.

In contrast to the afore described embodiment, the piston bore 86 forming the inner chamber 26 is extended in axial direction, so that the axial portion 78 is correspondingly shortened.

Similar to the embodiment illustrated in FIG. 1, the connecting bore 36 opens into a front face 22 of the sheath 4. This opening is positioned in the area in which the front face 22 is passed through by the valve shift 16. In the valve shift transverse bores 90 are formed which, on the one side, open into the piston bore 86 and, on the other side, into the outer periphery of the valve shift 16.

When the valve shift 16 is shifted axially away from the magnet, the transverse bores 90 are closed by a control land 92 formed by a circumferential groove 94 of the sheath 4 in the opening area. In the case of an axial shifting by the quantity T, the control cross section is completely closed. This means that in the normal position (currentless open) an additional control cross section is open which has a substantially larger diameter than that of the radial portion 80 and the connecting bore 36.

As is further shown in FIG. 8, triangular control windows may be formed instead of the circular case openings 30, so that the open control cross section increases quickly with increasing axial shifting.

With the variant illustrated in FIG. 8, the instabilities in the through-flowing characteristics can be further decreased vis-à-vis the afore described solutions.

FIG. 9 shows a preferred embodiment of a valve in currentless open construction, which stands out for an extremely simple construction and optimum through-flow characteristics.

In the embodiment illustrated, the valve shift 16 comprises a piston bore 86 which has approximately the same length as the piston bore 86 and the axial portion 76 together in the embodiments illustrated in FIGS. 7 and 8.

In the area of the end portion of the axially extending piston bore 86 one or several radial portions 80 are provided, via which the inner chamber 26 limited by the piston bore 86 is connected with the spring chamber 38.

Similar to the embodiment illustrated in FIG. 2, the housing bore 36 is designed parallel to the axis and opens into the front face 22 of the sheath.

Furthermore, the radial bore star 24, which may be formed of individual bores displaced vis-à-vis one another, opens in this preferred embodiment directly into the axial bore 8 and not—as in the afore described embodiments—into an annular groove 82 of the sheath 4. This means that the radial bore star 24 is directly opened or closed, respectively, by the circumferential edge 96 of the valve shift 16 acting as a control land.

The illustrated embodiment is readily manufactured since the axial bore 8 can be formed substantially continuously without an annular groove 82, and since the housing bore 36 can also be manufactured in one single operation. The valve shift 16 is also of extremely efficient construction since no step bores like in the embodiments illustrated in FIGS. 7 and 8 have to be provided in its interior.

Of course, in the embodiment illustrated in FIG. 9 there can, instead of the radial bore star 24 with circular case openings, also some other geometry be chosen, for instance the triangular control windows in accordance with FIG. 8.

Figure 10:
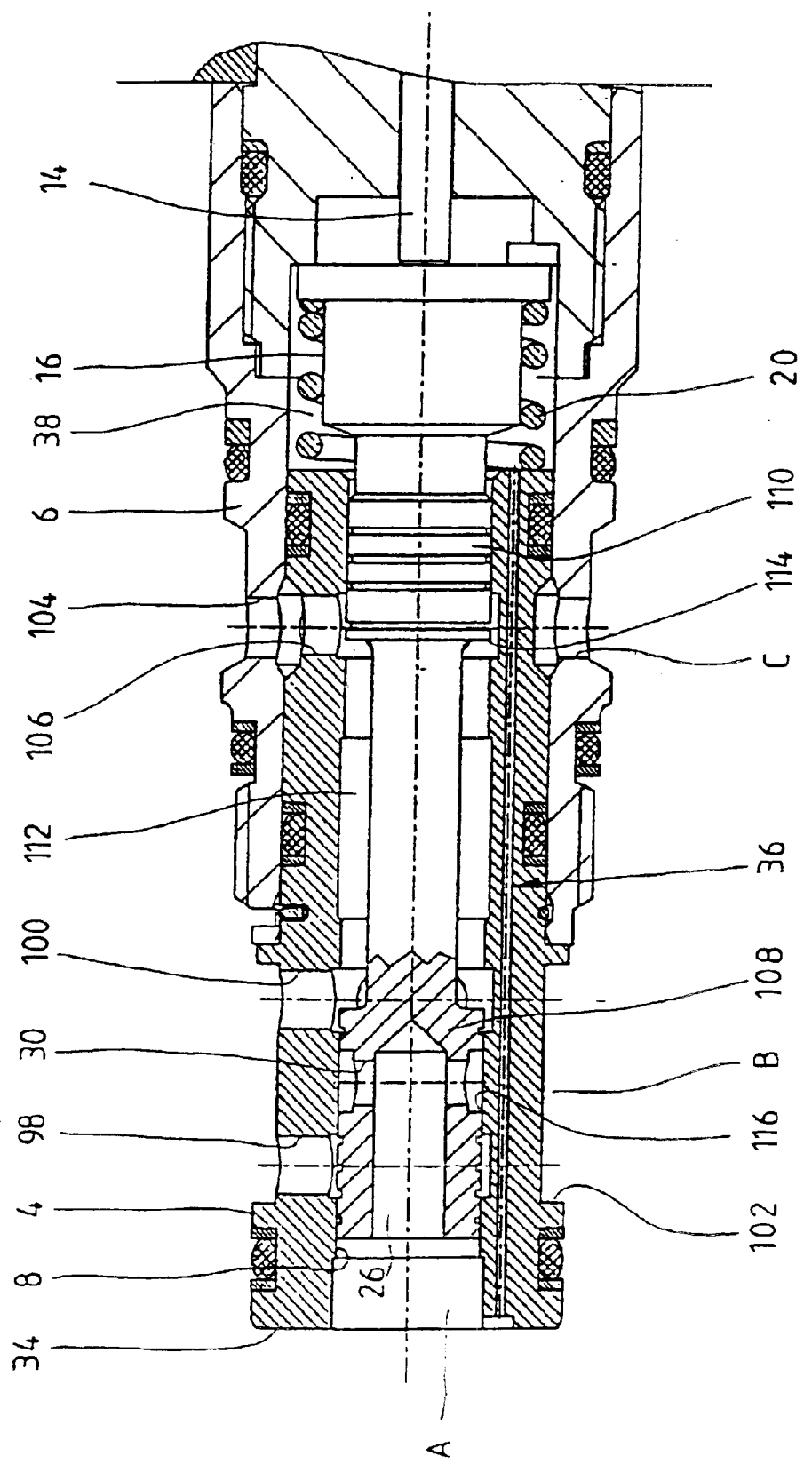
FIG. 10 shows an embodiment as a three-two directional control valve.

In the afore described embodiments, the directional control valve is designed as a two-two directional control valve. The invention is, of course, also applicable with constructions having a plurality of connectors. FIG. 10 shows a variant in which the directional control valve is provided with three connectors. In the variant illustrated, an axial connector A, a radial connector B formed by two radial bore stars 98, 100 and a circumferential annular groove 102, and a further radial connector C formed by case openings 104 of the housing 6 and openings 106 of the sheath 4 in alignment therewith are provided in the sheath 4 incorporated in the valve housing 6. The valve shift 16 has—like the afore described embodiments—an inner chamber 26 formed by a blind hole bore, into which case openings 30 of the valve shift 16 open. The valve shift illustrated has two annular collars 108, 110 in the portion guided in the axial bore 8. The annular front faces of these two annular collars 108, 110 are formed such that, in the normal position of the valve shift 16, in which the valve shift 16 is prestressed by the compression spring 20 against a stop, the two connectors B and C are connected with one another via an annular chamber 112. The spring chamber 38 incorporating the compression spring 20 is connected via a housing bore 36 with the area adjacent to the front side 34 of the sheath 4. The actuation of the valve illustrated in FIG. 10 is performed via a proportionally adjustable magnet or via a switching magnet, the plunger 14 of which is in contact with the—in FIG. 1—right front face of the valve shift 16. In the basic position illustrated, the case openings 30 of the valve shift 16 are closed by the web between the two radial bore stars 98, 100, so that no connection exists between the front-side connector A and any of the radial connectors B, C.

On triggering the electromagnet, the valve shift 16 is shifted towards the left against the force of the compression spring 20, so that a control land 114 formed by the annular front face of the annular collar 110 closes the connector C, while a control land 116 formed by the circumferential edge of the case opening 30 opens the radial bore star 98, so that the connection from the front-side connector A to the radial connector B is opened. In the spring chamber 38 of the compression spring 20 there is always prevailing the pressure that is tapped at the distance of the valve shift 16 over the housing bore 36. In the embodiment illustrated, the housing bore 36 is formed as a straight through bore; of course, depending on the construction of the valve housing—the afore described variants may also be used for tapping the pressure in the spring chamber.

The variants described can be provided as currentless open or currentless closed valves. The afore described directional control valves 1 may, of course, also be provided as seat valves.

Disclosed is a directional control valve comprising a front-side connector and at least one radial connector, wherein the front faces of a valve body (valve shift or seat body) of the directional control valve are pressurized approximately equally, so that the actuating forces for shifting the valve body are minimal. In accordance with the invention, the pressure for pressurizing a rearward front face of the valve body is tapped at an axial distance to the valve body.

What is claimed is:

1. A directional control valve, comprising a valve body guided in a valve bore of a housing, via which a connection between a front-side connector (A) and at least one radial connector (B) can be opened and closed, with the pressure effective at said front-side connector (A) being guided to the valve body rear side via a connecting bore, wherein the pressure is tapped at p distance from said valve body in the area of said front-side connector (A).

2. The directional control valve according to claim 1, wherein said valve body is cup-shaped and comprises a casing having case openings adapted to connect said front-side connector (A) with said radial connector (B).

3. The directional control valve according to claim 2, wherein said valve body comprises an inner bore which opens into a rearward pressure chamber, and into which a tube is inserted which extends from said inner bore out of said valve body towards said front-side connector (A).

4. The directional control valve according to claim 1, further comprising a housing channel which, on the one side, opens into the area of said front-side connector (A) and, on the other side, into said rearward pressure chamber.

5. The directional control valve according to claim 4, wherein said housing channel is designed as an angle bore, and a first leg opening into the front face of said front-side connected (A) is formed as a bore parallel to an axis, and a second leg opening into said rearward pressure chamber is formed as an inclined bore.

6. The directional control valve according to claim 4, wherein said housing channel cuts at least one radial bore of said radial connector (B), and a sealing tube is inserted in the cutting area.

7. The directional control valve according to claim 4, wherein said valve body comprises a connecting channel which, on one side, opens into a connector-side front side of said valve body and, on another side, in said rearward pressure chamber.

8. The directional control valve according to claim 7, wherein said connecting channel comprises an axial portion which merges into radial portions opening into said rearward pressure chamber.

9. The directional control valve according to claim 8, comprising transverse bores via which an additional through-flow cross section to said pressure chamber can be opened or closed, respectively, after an axial shifting of said valve body.

10. The directional control valve according to claim 1, wherein said radial connector (B) opens into said valve bore to said housing via a radial bore star.

11. The directional control valve according to claim 1, wherein said directional control valve is designed currentless open or currentless closed.

12. The directional control valve according to claim 1, wherein an inner piston that is stationary in the housing is guided in an inner chamber of said valve body, said inner piston being positioned in an area between said case openings and an inner front face of said valve body and limiting with said valve body a damping chamber connected with said rearward pressure chamber.

13. The directional control valve according to claim 12, wherein a throttle bore is formed in said casing of said valve body, said throttle bore opening, on one side, into said rearward pressure chamber and, on another side, into said damping chamber.

14. The directional control valve according to claim 12, wherein said inner piston is fixed in said housing via a pin passing at least through one long hole of said valve body.

15. The directional control valve according to claim 1, wherein said valve body is a valve shift preferably actuated via an electromagnetic.

16. The directional control valve according to claim 1, wherein the directional control valve is continuously adjustable.

* * * * *